Figure 1:
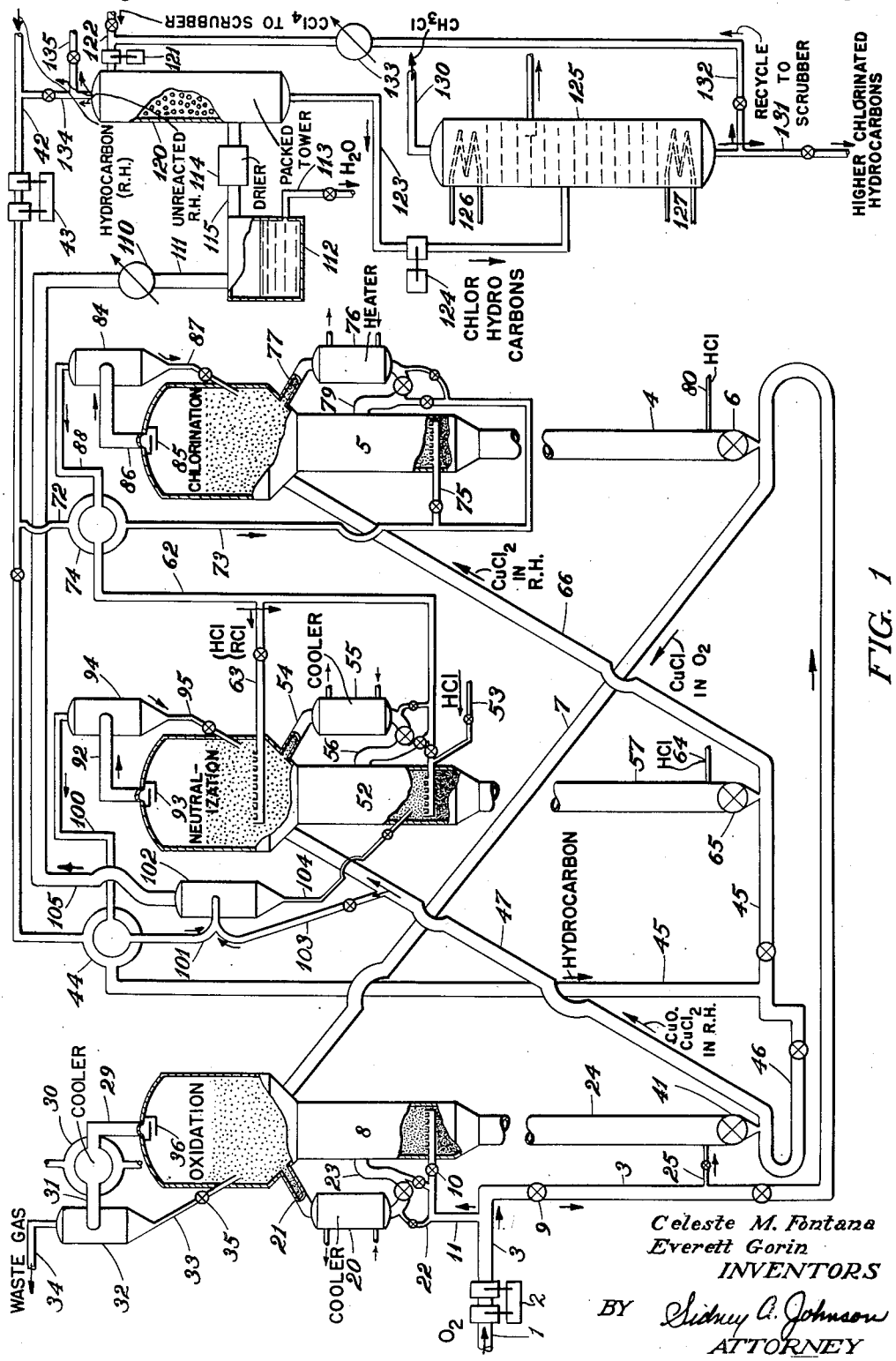

Nov. 13, 1951  C. M. FONTANA ET AL  2,575,167
MANUFACTURE OF HALOGENATED HYDROCARBONS
Filed Aug. 7, 1944  2 SHEETS—SHEET 1

Celeste M. Fontana
Everett Gorin
INVENTORS
BY Sidney A. Johnson
ATTORNEY

Nov. 13, 1951  C. M. FONTANA ET AL  2,575,167
MANUFACTURE OF HALOGENATED HYDROCARBONS
Filed Aug. 7, 1944  2 SHEETS—SHEET 2

Celeste M. Fontana
Everett Gorin
INVENTORS
BY Sidney A. Johnson
ATTORNEY

Patented Nov. 13, 1951

2,575,167

UNITED STATES PATENT OFFICE 2,575,167

MANUFACTURE OF HALOGENATED HYDROCARBONS

Celeste M. Fontana and Everett Gorin, Dallas, Tex., assignors, by mesne assignments, to Socony-Vacuum Oil Company, Incorporated, New York, N. Y., a corporation of New York Application August 7, 1944, Serial No. 548,351

14 Claims. (Cl. 260—659)

This invention relates to the manufacture of halogenated hydrocarbons from hydrochloric acid. More particularly this invention relates to a method for the continuous production of alkyl chlorides such as methyl chloride from natural gas and hydrogen chloride. Various halogenated hydrocarbons are of great importance in the organic chemical and petroleum industries, as reactive intermediates for the production of many essential materials. The manufacture of butadiene from dichlor butane, the alkylation of methyl chloride with benzene to give toluene and the hydrolysis of chlorbenzene to give phenol are but a few examples of the industrial importance of these halides of hydrocarbons. Methyl chloride in particular is a valuable intermediate for the production of benzene, toluene, acetylene and ethylene from methane, the principal component of natural gas.

In all of the processes mentioned above, halogen acids are liberated both in the production of the halides by a halogenation procedure and in their subsequent conversion to the final products. The commercial feasibility of most of these processes depends upon the economical recovery of the halogen acids produced and their reconversion to the corresponding halide.

Several prior art methods have attempted the recovery and reconversion of halogen acids by processes wherein the oxidation of the acid and the chlorination of methane are carried out simultaneously. For example, it has been suggested that methyl chloride be produced by passing a mixture of methane, hydrogen chloride and air, or oxygen, over a supported copper halide catalyst. In a similar manner it has been proposed to manufacture chlorbenzene by reaction between benzene, hydrochloric acid and air. However, methods involving simultaneous oxidation of hydrogen chloride and chlorination of hydrocarbons, specifically in the case of methane cause considerable oxidation of the methane and yields of chlormethane obtained by this method are small while considerable amounts of hydrogen chloride pass through the converter unchanged. The analogous method for the production of aryl chlorides, such as chlorbenzene, is somewhat more satisfactory, the oxychlorination of benzene being much more rapid than the corresponding reaction with methane, especially when promoted copper halide catalysts are used. The reaction with benzene can therefore be carried out at lower temperatures than the corresponding methane reaction, thus greatly reducing the possibility of side reactions, such as oxidation and hydrolysis. Low temperature operation, however, greatly limits the throughput obtainable, especially if quantitative conversion of the hydrogen chloride in a single pass is desired. A further disadvantage of this type of process lies in the fact that the halides of hydrocarbons produced are diluted with large quantities of air from which the quantitative recovery of the halogenated hydrocarbon requires additional and expensive processing.

The primary object of the present invention is to provide a continuous method for the production of alkyl chlorides from natural gas. A second object of the invention is to provide a continuous method for the production of alkyl chlorides uncontaminated with air. Another object of the invention is to provide an improved method for effecting contact between a liquid copper chloride melt and the gaseous hydrocarbon to be chlorinated and/or the various reactant gases involved in the process. Still another object of this invention is to provide a continuous process for the manufacture of alkyl chlorides in quantity with efficient recovery of the hydrogen chloride produced in such process. A further object of the invention is to manufacture methyl chloride intermediate from natural gas in a continuous process wherein the hydrogen chloride formed in the process, as well as the hydrogen chloride formed in processes utilizing said methyl chloride intermediate is recovered and recycled to the methyl chloride manufacturing process. Other and further objects of the invention will be apparent from the following detailed description thereof and the accompanying drawings.

The invention involves the adaptation of hindered flow of fluidized finely divided solids for contacting the chlorides of copper with air, hydrogen chloride and hydrocarbon gas to produce halides of hydrocarbons and particularly the invention involves the contacting of copper chloride-alkali metal chloride mixtures mounted on inert finely divided solids with the above gases in hindered flow operations. These chloride mixtures have been described and claimed in the copending application of C. M. Fontana, one of us, entitled Oxygen Absorption Media, Serial No. 548,349, filed August 7, 1944, now Patent No. 2,447,323. The use of such mixtures of halides in processes for manufacturing chlorine has been described and claimed in the copending applications of Everett Gorin, Serial Nos. 507,616 and 507,617, now Patent No. 2,418,930. Their use in processes for manufacturing chlorides of hydrocarbons has also been described and claimed in the copending application of Everett Gorin, entitled Hydrocarbon Conversion, Serial No. 507,618, filed October 25, 1943, now Patent No. 2,407,828.

In carrying out our process, oxygen is absorbed from the air by a finely divided copper chloride impregnated solid carrier such as copper chloride impregnated natural clay as Attapulgus clay or copper chloride impregnated infusorial earth or fuller's earth. Copper chloride impregnated porous synthetic gels such as alumina gel or silica gel may also be used. The oxidized impregnated carrier is suspended in a stream of hydrogen chloride gas to convert at least a part of the cupric oxide and cupric oxychloride to cupric chloride, after which the predominantly cupric chloride impregnated carrier is subjected to a hydrocarbon stream in gaseous form to produce the corresponding chlorinated hydrocarbon and hydrogen chloride.

We have found that an alkali metal chloride such as potassium chloride in amounts within the range of from about 20 mole percent to about 50 mole percent of impregnated chlorides increases the rate of oxygen absorption. Hence, the carrier material may be impregnated with an aqueous solution containing potassium chloride and cupric chloride preferably in relative amounts of about 30 moles of potassium chloride to about 70 moles of cupric chloride. The finely divided carrier is impregnated to the extent of from about 20 percent to about 65 percent chlorides based on the total weight of the impregnated mass which is then crushed and graded for use. Material passing through a 10 mesh screen and retained on a 20 mesh screen may be used in our process, but we prefer material within the range of 50 micron diameter to material passing through a 30 mesh screen and retained on a 35 mesh screen. Powder as fine as 10 microns may be used but the use of such material results in high reactant losses.

Since it is desired to use the impregnated carrier in the oxygen absorption step, a major part of the cupric chloride component must be reduced first to cuprous chloride. This may be accomplished by contacting the material with a hydrocarbon in the chlorination zone, described hereinbelow or by heating at temperatures in excess of 500° C. The amount of cupric chloride remaining in the impregnated reduced salt mixture for initial use in the oxidizing step preferably should be between about 0.25 to about 1.5 moles per mole of potassium chloride or other alkali metal chloride. The preferred range varies with the alkali metal chloride content of the melt and lies, for example, between about 0.5 to 1 mole of cupric chloride per mole of potassium chloride where 30 mole percent potassium chloride melts are employed. In the absence of alkali metal chlorides, the cupric chlorides may be theoretically completely reduced, but practically a small amount of cupric chloride will be retained on the impregnated carrier, and, in actual operation this will reach an equilibrium value.

As indicated above our process involves three main chemical reactions which may be illustrated by the following equations:

(1) $2CuCl + \frac{1}{2}O_2 \rightarrow CuO \cdot CuCl_2$
(2) $CuO \cdot CuCl_2 + 2HCl \rightarrow 2CuCl_2 + H_2O$
(3) $2CuCl_2 + RH \rightarrow 2CuCl + RCl + HCl$ The above reactions which we designate as oxidation, neutralization and chlorination reactions respectively, may be carried out by suspending the impregnated carrier in the appropriate reactant gas in hindered flow type operation either in separate reaction zones or in two reaction zones by combining the second, i. e., neutralization step with the first, i. e., oxidation step. The advantages peculiar to operating according to either of these embodiments of our invention are described more fully below in Figures 1 and 2.

Referring now to Figure 1, an oxygen containing gas such as air is passed through line 1 and compressor 2 via line 3 to the injector at the base of standpipe 4 which delivers finely divided natural clay impregnated with potassium chloride, cupric chloride and cuprous chloride in the approximate ratio of 30 moles potassium chloride, 10 to 30 moles of cupric chloride and 40 to 60 moles of cuprous chloride, standpipe 4 being supplied with "reduced" impregnated solid by chlorination tower 5. The amount of powder injected to the air stream is regulated by control valve 6 and the finely divided impregnated powder is carried via transfer line 7 to the oxidation tower 8.

In tower 8, the impregnated solid may be contacted with additional heated air through valve 10 in line 11 by adjustment of valve 9 in the main air supply line 3. Oxidation of the impregnated solid takes place in tower 8 according to Equation 1 above and, due to the exothermic heat of the reaction, the temperature therein rises. The temperature maintained in tower 8 should be within the range of 325° C. and 425° C., preferably within the range of 350° C. to 400° C. In order to avoid higher temperatures, cooler 20 is provided. A part of the hot impregnated powder is withdrawn through line 21 and sufficient air is introduced to cooler 20 via valved line 22 to fluidize the cooled powder for transfer via valved line 23 leading back to tower 8. Additional air may be added to line 23 between the valve in line 23 and the tower to carry the cooled powder to tower 8. Sufficient air to fluidize settled powder in standpipe 24 described below is introduced via valved line 25. Cooler 20 may be furnished with cold water as the cooling liquid, i. e., it may take the form of a waste heat boiler.

As air arises in the main mass of the reactants in tower 8 at a linear velocity within the range of about 0.25 to about 5.0 feet per second the mass of powdered solid assumes a state resembling boiling liquid, and a pseudo interface develops between the lower relatively dense phase and the upper rarified or dispersed phase.

The density of the fluidized solid in the dense phase will depend on the settled density of the impregnated carrier. The settled density may vary from 15 to 120 pounds per cubic foot depending on whether a relatively low density carrier such as kieselguhr or a high density carrier such as alumina gel is utilized. A second factor influencing dense phase density of material of a given particle size is the linear velocity of the suspending gas. We have found that the density in the dense phase for suitable operation will range from about 0.2 to about 0.7 times the density of the settled powder. We have also found that the density of the powder in standpipes and coolers wherein the linear velocity of the suspending gases is usually within the range of 0.025 and 0.20 feet per second is from about 0.7 to about 0.9 times the settled density of the powder. For ideal operation the rarified or dilute phase may contain as little as 25 or 50 grains of powder per cubic foot. Usually the density will range from one or two pounds per cubic foot down to this low figure.

Air, partially depleted of oxygen, passes from tower 8 through line 29 to cooler 30 where it is cooled to a temperature in the range of 200° C. and 300° C. within which temperature range any volatilized cuprous chloride is condensed and reabsorbed in the suspended impregnated powder. Cooler 30 may be supplied with cooling fluid, such as air or water. This condensed cuprous chloride serves to absorb any chlorine formed by the decomposition of impregnated cupric chloride. The cooled effluent gas is passed through line 31 to cyclone separator 32 for separation of the suspended impregnated powder which is returned via dip leg 33 to tower 8 and the clarified oxygen depleted air passes from cyclone separator 32 through line 34 from the system. Dip leg 33 may be provided with a valve 35 to permit accumulation of precipitated powder therein which is fluidized with air to obtain free flow of powder to the dense phase in tower 8. If desired, tower 8 may be supplied with baffles 36 to decrease the amount of suspended powder carried via line 29 to cooler 30.

From the bottom of standpipe 24, oxidized powder in amounts regulated by the operation of control valve 41, is picked up by a hot stream of hydrocarbon gases such as natural gas introduced to the system via line 42, compressor 43, heat exchanger 44 and lines 45 and 46, the suspended oxidized powder being delivered by transfer line 47 to neutralization tower 52 where the principal reaction taking place is that represented by Equation 2 above. Alternatively the main stream of natural gas used to transport the oxidized powder through line 47 may be passed through a cyclone separator before delivering the powder to tower 52. The powder is then delivered by a dip leg to tower 52 and the overhead from said additional cyclone separator can be used after compression in lines 45 and 66 for transport of the neutralized reactant powder to tower 5 as described below.

Cupric oxychloride and dissociated cupric oxide in close contact with the cupric chloride on the carrier are converted to cupric chloride in tower 52 by hydrogen chloride introduced through line 53. Since the reaction is exothermic, provision is made for removing heat from tower 52 by withdrawing hot powdered chloride impregnated solid via line 54 leading to cooler 55 which powdered solid is returned to tower 52 via valved line 56. As in the case of cooler 20 for cooling the reactant in tower 8, cooler 55 may be a waste heat boiler. Hydrogen chloride or superheated steam may be used to fluidize the hot powder in line 56 and cooler 55 and also to carry cooled powder back to tower 52. Standpipe 57 may be aerated with hydrogen chloride. The temperature maintained in tower 52 should be below 400° C. in order to avoid desorption of oxygen from the oxidized reactant. Low temperatures tend to avoid the decomposition of cupric chloride formed as a result of the neutralization reaction and also decomposition of the chlorinated hydrocarbon introduced with overhead product from tower 5 as described hereinafter. Temperatures as low as 200° C. or lower are sufficient to promote the neutralization reaction and the neutralization is more favorable at the lower temperatures. However, since a relatively higher temperature is required for the subsequent reaction of the powdered reactant in tower 5, it is less economical from the standpoint of over-all heat requirement of the process to operate tower 52 in the lower temperature ranges. Therefore we prefer to operate the neutralization tower 52 at temperatures within the range of from about 325° C. to about 400° C.

Tower 52 also serves as a fractionation zone for separation of hydrogen chloride from chlorinated hydrocarbon produced in tower 5. Referring to Equation 3 above, it is to be noted that for every mole of chlorinated hydrocarbon produced by the action of cupric chloride on the hydrocarbon, a mole of hydrogen chloride is also produced. Hence the clarified, cooled overhead product from tower 5 is introduced via lines 62 and 63 to tower 52 to furnish additional hydrogen chloride for the neutralization and to simultaneously remove said hydrogen chloride from the chlorinated product. The total amount of hydrogen chloride introduced to tower 52 is usually about four moles per mole of oxygen absorbed by the cuprous chloride impregnated carrier in tower 8. As the cupric chloride enriched carrier settles in standpipe 57 at the base of tower 52 it is fluidized by hydrogen chloride introduced by line 64 as stated hereinabove, and is delivered in regulated amounts by control valve 65 to the hydrocarbon stream in line 45 whence the powder is delivered through transfer line 66 to chlorination tower 5. Additional hydrocarbon is introduced to tower 5 via lines 42, 72 and 73, heat exchanger 74, and valved line 75.

Tower 5 is maintained within the temperature range of about 400° C., preferably about 425° C. to about 525° C. Since the reaction in tower 5 tends to be endothermic, especially for the chlorination of the lower hydrocarbons such as methane with cupric chloride, auxiliary heater 76 is provided. Heater 76 may be supplied with heat by means of any suitable heating fluid such as flue gas or superheated steam. Fluidized powdered reactant may be drawn off from tower 5 through line 77 and heater 76, and returned to tower 5 through valved line 79 which may be fluidized with the vaporized hydrocarbon or with hydrogen chloride. As the reduced impregnated powder settles in standpipe 4 it is fluidized, preferably with anhydrous HCl introduced via line 80 and, as stated above, it is picked up by air in line 3 and recycled to tower 8 for reoxidation to the oxychloride.

Tower 5 is provided with cyclone separator 84 and is desired, additional solid recovery means for clarifying the effluent gas stream comprising unreacted hydrocarbon, chlorinated hydrocarbon and hydrogen chloride. Baffles 85, suitably placed near the vent to reactor effluent line 86 will also aid in reducing carry-over of suspended powder reactant. The effluent stream passes via line 86 to separator 84 provided with fluidized dip leg 87 for return of separated solid reactant to the fluidized reactant in tower 5. The clarified vapor effluent passes from separator 84 via line 88, through heat exchanger 74 for preheating hydrocarbon feed and thence to tower 52 as hereinabove described.

Returning to the operation of neutralization tower 52, provision is made for clarifying the effluent product in line 92 by means of baffles 93 and further clarification is provided by cyclone separator 94 with fluidized dip leg 95 for return of powdered reactant to the tower. Dip leg 95 as well as dip legs 33 and 87 may be provided with suitable valves to restrict the flow of returned powdered solid therethrough to continuous or intermittent fluid flow, produced by allowing powder to settle therein and then fluidizing with appropriate fluidizing gas.

The effluent stream from tower 52, comprising predominantly chlorinated hydrocarbon, unreacted hydrocarbon and water vapor, also contains minor amounts of vaporized chlorides from the highly concentrated cupric chloride impregnated powder. The effluent stream will also contain some hydrogen chloride since the presence of water vapor in contact with the cupric chloride tends to hydrolyze the chloride. It is highly desirable to recover the hydrogen chloride and chlorine and return it to tower 52, not only as an economy necessary for the successful operation of the process but also to reduce corrosion trouble in the final steps of recovering the chlorinated hydrocarbon. The chlorine and hydrogen chloride are readily absorbed by freshly oxidized reactant, i. e., by the cupric oxychloride impregnated powder and hence may be recovered by the method described below.

Clarified effluent leaving cyclone separator 94 via line 100 is cooled in heat exchanger 44 to produce condensation of volatilized chloride and the effluent passes thence through line 101 to a second separator such as cyclone separator 102. At an intermediate point between heat exchanger 44 and separator 102 the stream is joined by a stream of gaseous hydrocarbon carrying suspended therein freshly oxidized powder (cupric oxychloride impregnated carrier) introduced from varied line 103 which joins transfer line 47. By means of intimate line mixing, the freshly oxidized powder absorbs hydrogen chloride and chlorine from the cooled effluent stream in line 101 and the suspended solid is separated from the effluent stream in cyclone separator 102. The enriched powder is returned through valved and aerated dip leg 104 to tower 52.

The purified clarified effluent product is pased from separator 102 through line 105 to condenser 110 and thence by line 111 to separator 112 for the separation of chlorinated hydrocarbon and unreacted hydrocarbon from the water which is drawn off through valved line 113. The mixture of chlorinated hydrocarbons and unreacted hydrocarbon may be passed to drier 114 in line 115 and thence to packed tower absorber 120 for separation of unreacted hydrocarbon.

In absorber 120 the mixture of unreacted hydrocarbon vapor and vaporized chlorinated hydrocarbons is countercurrently contacted with a liquid stream of highly chlorinated hydrocarbon such as carbon tetrachloride or the heavy fraction of chlorinated hydrocarbon from the process. This absorbent liquid is introduced to absorber 120 by means of pump 121 in line 122. The enriched absorbent is heat exchanged (not shown) with any of the hot streams of the process and then transferred via line 123 by means of pump 124 to fractionator 125 provided with reflux means 126 and reboiler means 127. Chlorinated light hydrocarbon, such as methyl chloride is taken overhead via line 130 and the higher chlorinated hydrocarbons and chlorinated higher hydrocarbons are taken off as bottom product through valved line 131. A part of this stripped product may be recycled through line 132 and cooler 133, by pump 121 in line 122 for reuse as absorbent in absorber 120. Absorber overhead, i. e., unabsorbed unreacted hydrocarbon vapor is recycled to the chlorination process through valved line 134 leading to hydrocarbon feed line 42. Valved line 135 leading from valved line 134 is provided for the purpose of withdrawal of absorber overhead product for purification as by fractionation before recycle where such procedure is desirable. The foregoing description of the recovery of the chlorinated product is by way of description of an operable method and should not be considered as restrictive in interpreting our process since other methods well known to the art are applicable.

Figure 2:
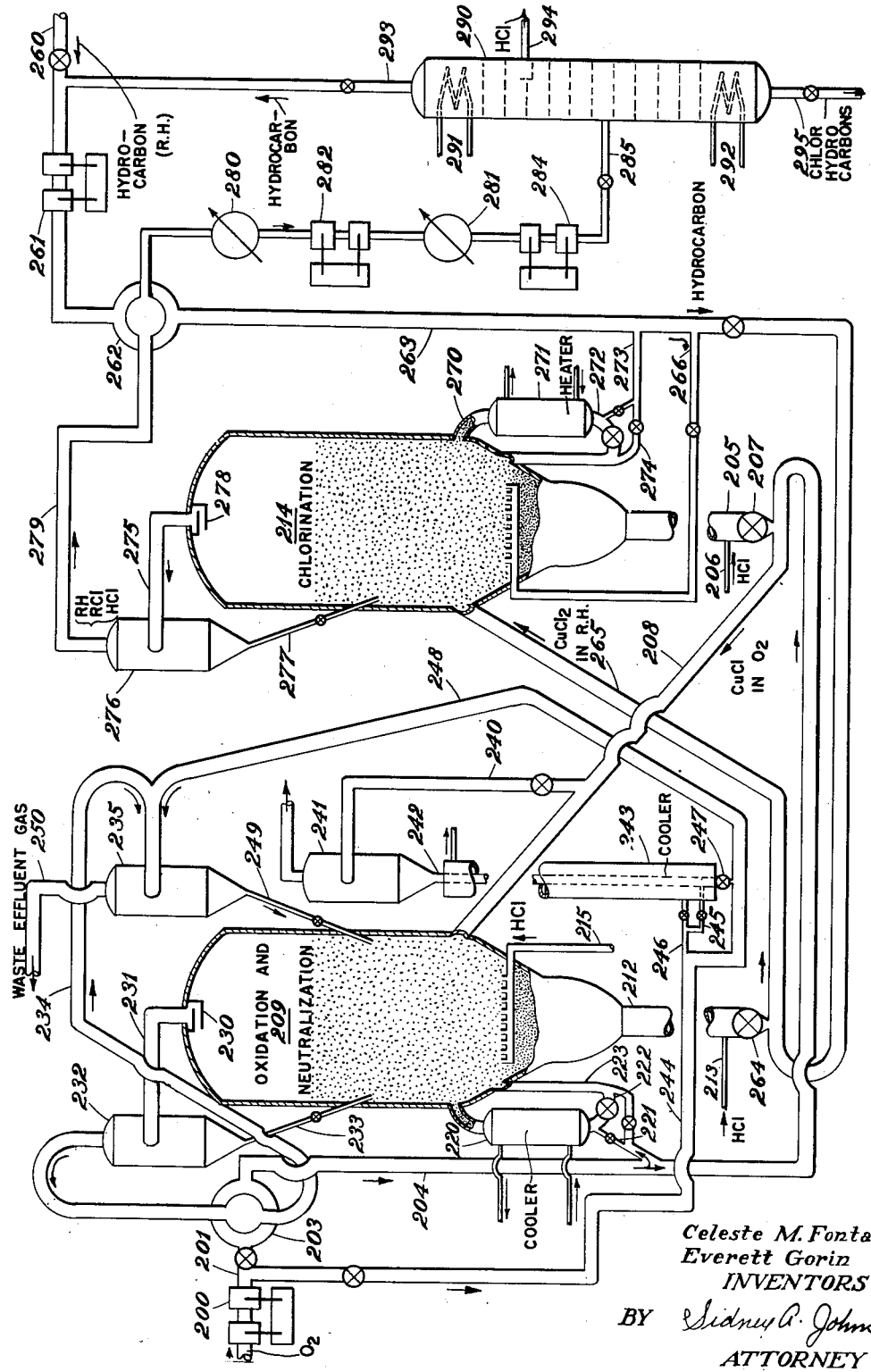

In the above description of the three reaction-three zone system for carrying out our process, the chlorinator overhead is directed to the second or neutralization reaction zone for reacting and recovering the hydrogen chloride produced in the chlorination reaction. This type of operation has the advantage of providing a chlorinated product substantially free of hydrogen chloride. Under certain circumstances, it may be desirable to operate a three reaction zone system with the neutralization reaction isolated from the chlorination reaction effluent gas, as, for example, when it is desirable to recover in the neutralization tower the hydrogen chloride from any foreign gaseous stream. For this type of operation cooled overhead product in line 62 would be compressed and recooled for fractionation of the anhydrous hydrogen chloride, unreacted hydrocarbon and chlorinated hydrocarbon mixture as shown in Figure 2 described below. The hydrogen chloride would be recycled to neutralization tower 52. For this type of operation the vaporized hydrocarbon in line 45 would be used for reactant transfer only when carrying the neutralized-oxidized impregnated carrier from the base of standpipe 57 to tower 5. Superheated steam or hydrogen chloride bearing foreign gas from the external source could be used in transfer line 47 for transfer of oxidized impregnated carrier from the base of standpipe 24 to neutralization tower 52.

The reaction towers are usually operated at substantially atmospheric pressure or at positive pressures up to ten or fifteen pounds gauge. On the other hand, all of the towers may be advantageously operated at pressures from atmospheric to as high as four or five atmospheres. If operation of any one tower or towers is at substantially higher pressures than the pressure of operation of the other towers, suitable devices well known to those skilled in the art of transfer of powdered solids should be provided for transfer of the powdered solid to and from the higher pressure zones.

The residence time of the powdered carrier supported reactants in towers 8, 5 and 52 is controlled by the respective rates of the different reactions occurring therein, by the rate of flow of the respective reactant gases therethrough, and by the degree of conversion of the carrier supported reactant sought in the different steps of the process. The residence time should be controlled so as to convert from about 10 to about 50 mole percent of the copper salt per pass through the system.

In Figure 2 described hereinbelow we have shown a second embodiment of our invention wherein the oxidation reaction and the neutralization reaction as illustrated by Equations 1 and 2 above are carried out in the same reaction zone. This type of operation is advantageous primarily from the standpoint of economy in structural material requirement since only two reactors are required. Choice of the method of operation of our process relative to the use of a three reaction zone or a two reaction zone system is governed by such economic factors as the cost of compression of the gases involved, corrosion losses, loss of impregnated carrier, loss of hydrogen chloride or chlorine in effluent waste gases and cost of separation of hydrogen chloride from the chlorinated product.

Referring to Figure 2, a free oxygen containing gas such as air is passed by means of compressor 200 in valved line 201, via heat exchanger 203 and line 204 to the base of standpipe 205 for pickup of reduced copper chloride-alkali metal chloride impregnated carrier. If desired, the air feed line 201 may by-pass heat exchanger 203, the cooling of exchanger 203 being accomplished by means of a separate cooling fluid as described in Figure 1. Standpipe 205 is fluidized by injection of anhydrous hydrogen chloride introduced therein through line 206, the amount of reduced powdered reactant impregnated carrier delivered to the air stream in line 204 being regulated by control valve 207. The suspended finely divided solid is carried through line 208 to combination oxidation-neutralization reactor 209 by the air and hydrogen chloride with or without additional air is introduced through line 215. If desired, additional hydrogen chloride such as recycle gas obtained by the fractionation of effluent gaseous product from chlorination tower 214 described hereinbelow may be introduced to tower 209 through line 215. Standpipe 212 is fluidized with hydrogen chloride introduced thereto through line 213.

The contacting of copper chloride-alkali metal chloride mixture predominantly cuprous chloride-alkali metal chloride impregnated carrier with oxygen and hydrogen chloride produces simultaneously reactions illustrated by Equations 1 and 2 above and since these reactions are both highly exothermic considerable heat is developed in reactor 209. Hence cooler 220, which may represent a bank of multiple coolers disposed around reactor 209, is provided to regulate the temperature therein to a range of from about 325° C. to about 400° C. The partially settled powdered solid in cooler 220 is fluidized with air introduced by line 221 and the fluidized cooled mass is transferred through valve 222 and return line 223 to reactor 209. Additional air may be injected into line 223 to facilitate transfer of the cooled reactant to tower 209.

The production of a relatively large amount of water vapor in reactor 209 and a high concentration of cupric chloride in the reactant impregnated powdered solid therein and also the development of considerable heat by the exothermic reactions cooperate to produce hydrogen chloride by hydrolysis and chlorine by decomposition of the cupric chloride and hence the effluent gas from reactor 209 should be freed of these valuable components for return to the system before discarding said effluent gas from the process. This may be accomplished in the following manner.

Effluent gas carrying suspended powdered solid is partially clarified by baffles 230 before passing through overhead line 231 to cyclone separator 232 and other solid separation means such as Cottrell precipitators (not shown) for substantially complete removal of dust particles which are returned to reactor 209 via dip leg 233. The clarified efflux gas is cooled to a temperature within the range of about 200° C. to 250° C. in exchanger 203 whence it is passed by line 234 to separator 235.

As described hereinabove, it has been found that relatively cold freshly oxidized cuprous chloride impregnated carrier will absorb hydrogen chloride and chlorine from a gas stream containing these components. This freshly oxidized material may be furnished from hot transfer line 208 wherein the hot predominantly cuprous chloride impregnated powder introduced from standpipe 205 undergoes partial oxidation at a rapid rate according to Equation 1 due to the high temperature of the powder introduced thereto. A side stream is withdrawn therefrom through valved line 240 leading to a separator 241 provided with jacketed standpipe for the accumulation and cooling of separated oxidized material. Standpipe 242 is cooled by passing cold air through jacket 243 supplied through line 201, compressor 200 and valved lines 244 and 246. Fluidizing air for standpipe 242 is provided by line 245, and from line 244 carrier air for the cold material picks up the powder as it is delivered by control valve 247 and transfers it through line 248 to line 234 for mixing with cooled clarified effluent gas. The HCl-Cl$_2$ enriched powder is separated from the effluent gas in separator 235 and returned to reactor 209 through aerated dip leg 249. The effluent gas, relatively free of hydrogen chloride, chlorine and suspended or volatilized reactant is vented from the system through line 250.

Turning now to the chlorination step of our process, a hydrocarbon gas or a mixture of hydrocarbon gases such as natural gas is introduced to the system through line 260, compressor 261 and product heat exchanger 262 where it is raised in temperature and passes via line 263 to the base of standpipe 212 for pickup of hot oxidized-neutralized carrier supported chlorides delivered in regulated quantities by control valve 264. The hydrocarbon suspended, cupric chloride rich material is delivered to chlorination reactor 214 by means of transfer line 265, and additional hydrocarbon may be supplied to reactor 214 by means of valved line 266 leading from hydrocarbon feed line 263.

The temperature maintained in reactor 214 should be within the range of about 400° C. to 525° C. If natural gas is used as the hydrocarbon feed the reaction is slightly endothermic and it is necessary to supply heat to the reaction zone to furnish the necessary heat of reaction and to raise the temperature of the reactants to the higher temperature level. This is accomplished by withdrawing a stream of fluidized reactant from reactor 214 through overflow line 270 leading to heater 271 where it is heated in indirect heat exchange with any suitable heating fluid such as flue gas. The powdered reactant is maintained in the fluidized state in heater 271 by the introduction of a small stream of hydrocarbon gas to return line 272 through line 273 leading from line 263 and if desired additional hydrocarbon gas introduced to line 272 from line 274 may be used to carry the heated reactant back to reactor 214.

The reaction in tower 214 results in the formation of chlorinated hydrocarbon and hydrogen chloride vapors and a powdered reactant predominantly cuprous chloride with respect to impregnated chlorides of copper. This reduced powder settles in standpipe 205 and is transferred therefrom to reactor 209 as hereinabove described. Linear gas velocities in reactor 214 are in the same approximate range as those described above for hindered flow operation. Pressures in tower 214 may be atmospheric to as high as four or five atmospheres, higher pressures favoring recovery of the chlorinated products. However, as stated above, operation of the chlorination reactor at pressures substantially higher than the operating pressure of tower 209 requires special equipment for transfer of powdered reactant to and from tower 214.

The vapor effluent product of reactor 214 comprising unreacted hydrocarbon, chlorinated hydrocarbon and hydrogen chloride is passed through efflux line 275 to cyclone separator 276 equipped with fluidized dip leg 277 for return of suspended reactant to the reaction mass in reactor 214. The vent to line 275 is baffled with baffles 278 to reduce the amount of suspended material passing to separator 276. The clarified effluent is passed through line 279 and cooled in an initial cooling step by heat exchange with hydrocarbon feed in exchanger 262 as hereinabove described and further cooled and compressed in coolers 280 and 281 and compressors 282 and 284 for delivery via valved line 285 to high pressure fractionator 290. Fractionator 290 which is operated at pressures within the range of 300 pounds to 500 pounds per square inch, is equipped with reflux means 291 and reboiler means 292. Unreacted hydrocarbon, which is largely methane if natural gas is used as the feed to our process, is passed from fractionator 290 through valved line 293 to line 260 as recycle to the process. Hydrogen chloride is recovered as a side stream in line 294 for recycle to tower 209 and chlorinated hydrocarbons constitute the bottom product withdrawn from fractionator 209 through valved line 295.

While we have described the recovery of the chlorinated product by a simple distillation and fractionation process, the separation of unreacted hydrocarbon, hydrogen chloride and chlorinated hydrocarbons may also be accomplished by other methods. For example, the cooled effluent may be contacted countercurrently in a packed tower with high boiling chlorinated hydrocarbons for removal of the chlorinated hydrocarbons, and separation of the hydrogen chloride from the unreacted low boiling hydrocarbon such as methane may be made by passing the mixture in contact with water. The concentrated aqueous solution of hydrogen chloride may be used in the neutralization step in vaporized form.

Although we have described operating our process in such manner that reactant gases are utilized as transfer media for the reactant impregnated carrier we do not wish to be limited to such type operation. In certain cases, especially where impregnated solids of relatively high density are used and where high conversions per pass of the reactant gases and low conversions per pass of impregnated powder are desirable, the amount of gas necessary to transfer the powder between reaction zones may exceed the amount of reactant gas required for the reaction. Under such conditions, suitable inert carrier gases may be used to deliver the impregnated powder to intermediate cyclone separators located at levels above the reactors, as described in greater detail in our copending application entitled Manufacture Oxygen, Serial Number 548,350, filed August 7, 1944, now Patent No. 2,490,587. The impregnated powder under such type operation would be delivered from the cyclone separators to the dense phase of the reaction zone by means of a system of dip legs, suitably stripped if necessary. The reactant gases would be introduced directly to the respective reaction zones when operating according to this method.

Our invention has several advantages which are common to all embodiments thereof, and which heretofore have not been possible by known methods of producing chlorinated hydrocarbons. The use of finely divided reactant impregnated carrier material greatly increases the rate of reaction between the liquid melt and the particular gaseous reactant in the various steps of the process. The rate may be further increased by the incorporation of alkali metal halides, such as potassium chloride, in the reactant impregnated finely divided solid. Very uniform temperatures throughout the reactant mass of fluidized powder results in a much more even temperature control, and hence there is no tendency to decompose the reactants as a result of localized overheating where the reactions are either of an exothermic or endothermic nature. The fluidized powder also exhibits excellent heat transfer characteristics thus making possible the ready withdrawal of heat from and addition of heat to the reaction zone. A third advantage is that of simplicity of method of transfer of the reaction mass from zone to zone without the use of pumps. This advantage is of special importance in the handling of relatively corrosive liquid reactants such as the copper halide melts.

The embodiment of our invention shown in Figure 1 has the advantage of producing a final effluent product substantially free of hydrogen chloride. The separation of water from the chlorinated hydrocarbons is more easily accomplished than the separation of hydrogen chloride from the chlorinated product, which step is necessary in any embodiment involving a separate chlorination step with final product effluent taken therefrom.

While we have described our process of contacting a finely divided copper chloride-alkali metal halide impregnated carrier with reactant gases in towers adaptable to "hindered flow" operation we do not wish to be limited to the use of such towers. The reaction rates for the oxidation step and for the neutralization step are sufficiently high to make possible the carrying out of these steps in elongated pipe coils wherein the powder is carried along in continuous linear flow, the reactant gases being used as carrier gases. Obviously if sufficiently high temperatures such as 475° C. or higher are used for carrying out the chlorination step of the process, such type reactors could also be used for chlorinating the hydrocarbon, using the hydrocarbon as the carrier gas. A combination hindered flow-linear flow system of reactors may also be used in carrying out our process. We may also operate any one or all of the reactors at such lineal gas velocities that the powdered suspended reactant is taken overhead entirely, in which case separation of the suspended solid material would require a larger number of cyclone separator units and the separated solid would be transferred to succeeding reaction zones by a system of fluidized dip legs.

Although we have described a specific process for the production of chlorinated hydrocarbons wherein the chlorinating reactant, normally liquid at the reaction temperature, is impregnated on a powdered inert solid, we do not wish to be limited to such specific application. Other chemical reactions involving the contacting of gaseous reactants with reactants which are liquid at optimum temperatures of operation may be carried out by impregnating finely divided inert solids with the liquid reactants in order to operate with the supported reactant suspended by the carrier gaseous reactant in "hindered flow" or in lineal flow type operations.

The foregoing description has been made detailed for clarity only, and no unnecessary limitations should be understood therefrom, but the appended claims should be construed as broadly as permissible in view of the prior art.

We claim:

1. A continuous method for chlorinating normally gaseous paraffinic hydrocarbons by means of cupric chloride comprising the steps of (1) continuously oxidizing at a temperature of from about 325° C. to about 400° C. cuprous chloride supported on a finely divided solid suspended in an ascending free oxygen containing gas stream, (2) continuously neutralizing at a temperature of from about 325° C. to about 400° C. the oxidized cuprous chloride by suspending the same in a gas stream comprising hydrogen chloride to form cupric chloride therefrom, (3) continuously transferring as a suspension in a hydrocarbon gas the carrier supported cupric chloride to a separate reaction zone, (4) continuously suspending in said separate reaction zone maintained at a temperature above about 400° C. the carrier supported cupric chloride in a stream of the gaseous hydrocarbon to be chlorinated whereby said gaseous hydrocarbon is at least partially chlorinated and a major part of the supported cupric chloride is reduced to cuprous chloride, (5) continuously separating the gaseous product from step 4 comprising chlorinated hydrocarbon product, hydrogen chloride and unconverted hydrocarbon from the supported cuprous chloride of step 4, (6) continuously withdrawing supported cuprous chloride from said separate reaction zone and continuously circulating at least a part of said supported cuprous chloride to step 1, (7) continuously circulating at least a part of the hydrogen chloride of step 5 to step 2, and (8) recovering said chlorinated hydrocarbon from step 5 of the process.

2. The process as described in claim 1 wherein steps 1 and 2 are carried out simultaneously in the same reaction zone.

3. The process as described in claim 1 wherein steps 1 and 2 are carried out in separate reaction zones and wherein the supported cuprous chloride oxidation product of step 1 is continuously transferred in the form of a suspension of finely divided solid in a hydrocarbon gas from the first of said separate reaction zones to the second of said reaction zones for the conversion of said supported oxidized cuprous chloride to supported cupric chloride as described in step 2.

4. The continuous process for the chlorination of normally gaseous paraffinic hydrocarbons which comprises the steps of (1) continuously maintaining in a reaction zone a relatively dense fluidized mass of finely divided solid having cuprous chloride sorbed therewith in a stream of fluidizing gas consisting of a free oxygen containing gas at a temperature of from about 325° C. to about 425° C. such that the cuprous chloride is converted to supported cupric oxychloride, (2) continuously withdrawing oxygen depleted fluidizing gas from said reactant zone, (3) continuously passing a stream of said supported cupric oxychloride as a suspension in a stream of paraffinic hydrocarbon gas to a second reaction zone, (4) continuously maintaining therein a relatively dense fluidized mass of said supported cupric oxychloride by means of an ascending stream of gas consisting essentially of hydrogen chloride, the paraffinic hydrocarbon gas and chlorinated hydrocarbon gas introduced as hereinafter described to neutralize the cupric oxychloride and to substantially free the gaseous stream from hydrogen chloride, (5) continuously passing the stream of solid having cupric chloride sorbed therewith from the reaction zone of step 3 as a suspension of finely divided solid in a hydrocarbon gas to a third reaction zone and maintaining therein a dense fluidized mass by means of an ascending stream of the paraffinic hydrocarbon to be chlorinated while maintaining a temperature in said fluidized mass above about 400° C. to chlorinate said hydrocarbon whereby at least a part of the supported cupric chloride is reconverted to supported cuprous chloride, (6) continuously separating a gaseous mixture comprising chlorinated hydrocarbon, unreacted hydrocarbon and hydrogen chloride from the fluidized mass of step 5, (7) continuously recycling said supported cuprous chloride of step 5 as a suspension of finely divided solid in a free oxygen containing gas to the fluidized mass in the reaction zone of step 1, (8) continuously passing the gaseous mixture separated in step 6 to the relatively dense fluidized mass in the second reaction zone, and (9) recovering said chlorinated hydrocarbon from the gaseous effluent of the second reaction zone.

5. The process for the chlorination of normally gaseous paraffinic hydrocarbons which comprise (1) continuously introducing particles of an inert carrier impregnated with a substantial portion of cuprous chloride into a first reaction zone, (2) continuously contacting the impregnated carrier particles with a stream of free oxygen containing gas in the first reaction zone while maintaining a temperature of from about 325° C. to about 425° C. to oxidize at least a portion of the cuprous chloride impregnating salt, (3) continuously removing particles of inert carrier impregnated with the partially oxidized cuprous chloride from said zone, (4) passing a continuous stream comprising a gaseous suspension of the partially oxidized impregnated particles to a second reaction zone, (5) continuously contacting a fluidized mass of the partially oxidized impregnated carrier with a stream of gas comprising hydrogen chloride in the second reaction zone while maintaining a temperature below about 400° C. to neutralize cupric oxychloride whereby cupric chloride is formed therefrom, (6) continuously removing the carrier particles impregnated with cupric chloride from said second zone at a point a substantial distance from the point of introduction, (7) continuously transferring the particles impregnated with cupric chlorides suspended in a normally gaseous hydrocarbon gas to a third reaction zone, (8) continuously contacting the cupric chloride impregnated carrier with a stream of said hydrocarbon gas in the third reaction zone while maintaining the temperature in said reaction zone in a range favorable for hydrocarbon chlorination whereby at least a porition of the cupric chloride is reduced to cuprous chloride and the hydrocarbon is chlorinated, (9) continuously separating and recovering chlorinated hydrocarbon, hydrogen chloride and unconverted hydrocarbon from said third reaction zone, and (10) continuously circulating at least a portion of the carrier impregnated with reduced cupric chloride to step 1.

6. The process of claim 1 in which the normally gaseous paraffinic hydrocarbons are a natural gas.

7. The process of claim 1 in which methane is the normally gaseous paraffinic hydrocarbon employed.

8. A continuous method for chlorinating normally gaseous paraffinic hydrocarbons which comprises the steps of (1) continuously suspending cuprous chloride supported on a finely divided solid in admixture with an alkali metal halide by a free oxygen containing gas in the form of a relatively dense fluidized mass in a reaction zone maintained at a temperature above about 325° C. to convert at least a part of the cuprous chloride to cupric oxychloride, (2) continuously neutralizing at least a part of the cupric oxychloride by suspending the finely divided solid by a gas stream comprising hydrogen chloride in the form of a relatively dense fluidized mass in a reaction zone maintained at a temperature of from about 325° C. to about 400° C. to form cupric chloride, (3) transferring finely divided solid containing cupric chloride to a separate reaction zone, (4) continuously maintaining in the separate reaction zone a relatively dense fluidized mass of the finely divided solid by means of a stream of said hydrocarbons while maintaining a temperature above about 400° C. whereby at least a part of the cupric chloride is reduced to cuprous chloride and the paraffinic hydrocarbon chlorinated, (5) recovering the gaseous effluent comprising chlorinated hydrocarbon, unreacted hydrocarbon and hydrogen chloride from the separate reaction zone, (6) withdrawing the finely divided solid from the separate reaction zone and recirculating it to step 1 and (7) recovering chlorinated hydrocarbon from the effluent of step 5.

9. The process of claim 8 wherein steps 1 and 2 are carried out simultaneously in the same reaction zone.

10. The process of claim 8 wherein steps 1 and 2 are carried out in separate reaction zones.

11. The process of claim 8 wherein the alkali metal halide is potassium chloride.

12. The process of claim 8 wherein a predominantly methane containing natural gas is the paraffinic hydrocarbon material treated.

13. A continuous method for chlorinating normally gaseous paraffinic hydrocarbons which comprises the steps of (1) continuously suspending cuprous chloride supported on a finely divided solid in admixture with an alkali metal halide by a free oxygen containing gas in the form of a relatively dense fluidized mass in a reaction zone maintained at a temperature above about 325° C. to convert at least a part of the cuprous chloride to cupric oxychloride, (2) transferring the finely divided solid containing cupric oxychloride to a second reaction zone, (3) continuously neutralizing at least a part of the cupric oxychloride by suspending the finely divided solid by a gas stream consisting essentially of hydrogen chloride, chlorinated hydrocarbons, and normally gaseous paraffins obtained in the manner hereinafter described to form cupric chloride, (4) transferring the finely divided solid containing cupric chloride to a third reaction zone, (5) continuously suspending the finely divided solid in the form of a relatively dense fluidized mass by means of a stream of normally gaseous paraffins while maintaining a temperature above about 400° C. whereby at least a part of the cupric chloride is reduced to cuprous chloride and the paraffinic hydrocarbon chlorinated, (6) using the gaseous effluent from the third reaction zone as the suspending gas stream in the second reaction zone, (7) withdrawing the finely divided solid from the third reaction zone and recirculating it to step 1 and (8) recovering the chlorinated hydrocarbon from the gaseous effluent of the second reaction zone.

14. A continuous method for chlorinating normally gaseous paraffinic hydrocarbons by means of cupric chloride comprising the steps of (1) continuously oxidizing at a temperature of from about 325° C. to about 400° C. cuprous chloride supported on a finely divided solid suspended in an ascending free oxygen containing gas stream in a first reaction zone, (2) continuously neutralizing at a temperature of from about 325° C. to about 400° C. the oxidized cuprous chloride while suspended in a gas stream comprising hydrogen chloride obtained as hereinafter described in a second reaction zone to form cupric chloride, (3) continuously transferring the supported cupric chloride as a suspension in a paraffinic hydrocarbon gas to a third reaction zone, (4) continuously suspending the supported cupric chloride in the third reaction zone in a stream of the normally gaseous paraffinic hydrocarbon to be chlorinated while maintaining a temperature above about 400° C. whereby the paraffinic hydrocarbon is at least partially chlorinated and a major part of the cupric chloride reduced to cuprous chloride, (5) continuously separating the gaseous product from step 4 comprising chlorinated hydrocarbon product, hydrogen chloride and unconverted paraffinic hydrocarbon from the supported cuprous chloride, (6) returning the cuprous chloride obtained from step 5 to the first reaction zone, (7) continuously circulating the gaseous product stream recovered from step 5 to the second reaction zone for use as the gas stream therein, and (8) recovering chlorinated hydrocarbon from the gaseous effluent from the second reaction zone.

CELESTE M. FONTANA.
EVERETT GORIN.

REFERENCES CITED

The following references are of record in the file of this patent:

UNITED STATES PATENTS

| Number | Name | Date |
|---|---|---|
| 1,754,656 | Strosacker | Apr. 15, 1930 |
| 1,799,858 | Miller | Apr. 7, 1931 |
| 1,836,325 | James | Dec. 15, 1931 |
| 1,984,380 | Odell | Dec. 18, 1934 |
| 2,231,231 | Subkow | Feb. 11, 1941 |
| 2,407,828 | Gorin | Sept. 17, 1946 |

FOREIGN PATENTS

| Number | Country | Date |
|---|---|---|
| 5 | Great Britain | of 1864 |
| 3,171 | Great Britain | of 1866 |
| 214,293 | Great Britain | Apr. 14, 1924 |
| 559,080 | Great Britain | Feb. 3, 1944 |